United States Patent
Griffioen

[11] Patent Number: 6,047,954
[45] Date of Patent: Apr. 11, 2000

[54] PULLING ELEMENT FOR INSTALLING A CABLE IN A DUCT, AND DUCTING SYSTEM COMPRISING SUCH PULLING ELEMENT

[75] Inventor: Willem Griffioen, Ter Aar, Netherlands

[73] Assignee: Koninklijke KPN N.V., Groningen, Netherlands

[21] Appl. No.: 08/854,982

[22] Filed: May 13, 1997

[30] Foreign Application Priority Data

May 15, 1996 [NL] Netherlands ............................ 1003130

[51] Int. Cl.$^7$ ............................................... B65H 59/00
[52] U.S. Cl. ............................. 254/134.4; 254/134.3 R; 254/134.3 FT
[58] Field of Search ........................ 254/134.3 R, 134.4, 254/134.3 FT

[56] References Cited

U.S. PATENT DOCUMENTS

| | | | |
|---|---|---|---|
| 920,455 | 5/1909 | Greenan | 254/134.4 |
| 4,085,808 | 4/1978 | Kling . | |
| 5,172,890 | 12/1992 | Horii et al. | 254/134.4 |
| 5,197,715 | 3/1993 | Griffioen . | |
| 5,474,277 | 12/1995 | Griffioen . | |

FOREIGN PATENT DOCUMENTS

| | | | |
|---|---|---|---|
| 0 445 858 A1 | 9/1991 | European Pat. Off. . | |
| 2 677 501 | 12/1992 | France . | |
| 1624575A | 1/1991 | Russian Federation | 254/134.3 R |
| 2 152 621 | 8/1985 | United Kingdom . | |

OTHER PUBLICATIONS

Patent Abstracts of Japan vol. 18, No. 29; Jan. 17, 1994; & JP 05 260622 (Mitsubishi Electric Corp) Oct. 8, 1993.
Patent Abstrcts of Japan vol. 14, No. 394; Aug. 24, 1990; & JP 02 146910 (Akiyuki Shima) Jun. 6, 1990.
Patent Abstracts of Japan vol. 16, No. 96; Mar. 10, 1992; & JP 03 276104 (Nippon Tel. & Tel.) Dec. 6, 1991.
Patent Abstracts of Japan vol. 16, No. 31; Jan. 27, 1992; & JP 03 243107 (Furukawa Electric Co., Ltd.) Oct. 30, 1991.

*Primary Examiner*—David A. Scherbel
*Assistant Examiner*—Benjamin M. Halpern
*Attorney, Agent, or Firm*—Frishauf, Holtz, Goodman, Langer & Chick, P.C.

[57] ABSTRACT

A pulling element is provided for use in installing, by means of compressed area, cables in a ducting system including ducts having different inner diameters. The pulling element includes a first part having a first end which is connectable to a cable and a second end which includes a coupling member, wherein first flexible members are provided around a body of the first part for sealing engagement with an inner wall of a first duct having a first inner diameter. The pulling element also includes a second part having a central longitudinal opening and a coupling element capable of cooperating with the coupling member of the first part so as to actively couple the first and second parts when the first part is proximal to the second part, wherein second flexible members are provided around a body of the second part for engagement with an inner wall of a second duct having a second inner diameter greater than the first inner diameter.

18 Claims, 1 Drawing Sheet

6,047,954

PULLING ELEMENT FOR INSTALLING A CABLE IN A DUCT, AND DUCTING SYSTEM COMPRISING SUCH PULLING ELEMENT

BACKGROUND OF THE INVENTION

This invention relates to a pulling element with a body having an end which is connectable to a cable to be installed in a duct and having another end, the body being provided with flexible members intended for sealing engagement with the inner wall of such a duct.

Such a pulling element for the purpose of installing cables, in particular telecommunication cables, in a duct is known from British patent application 2,152,621. In the method described in that application, a reduced pressure is created at one end of the duct, and the pulling element having attached thereto the cable or a leader for a cable to be installed is inserted into the duct at the other end thereof. As a result of the pressure difference created, the pulling element is displaced through the duct and thus the cable or the leader is installed in the duct. In the known pulling element, flexible members serve to ensure that when the diameter of the duct varies, the flexible members are in engagement with the inner wall of the duct at all times, because otherwise the reduced pressure at the front of the pulling element would have no effect or too little effect. Variation in the diameter of the duct can occur not only with a duct having an irregular inner diameter, but also at the transition from a duct with a first diameter to a duct with a second, different diameter.

A drawback of the known pulling element is that the diameter variations that can be accommodated are relatively small, in accordance with a maximum travel of coil springs.

SUMMARY OF THE INVENTION

Accordingly, the object of the invention is to provide a pulling element suitable for use in a ducting system in which duct diameters can differ greatly and in which the installation proceeds from a duct or ducts with a first inner diameter into ducts with a second, greater inner diameter, and optionally even into ducts with a still greater inner diameter.

To that end, the invention provides a pulling element of the above-mentioned type, characterized in that the body of the pulling element comprises a first part, which is provided with flexible members suitable for engagement with the inner wall of a duct with a first inner diameter, which first part is provided at the other end with a coupling member, and a second part, comprising a central longitudinal opening, flexible members provided on the second part, which are suitable for engagement with the inner wall of a duct with a second inner diameter, which is greater than the first inner diameter, and a coupling element capable of cooperating with the coupling member of the first part so as to actively couple the two parts when the first part of the body of the pulling element, during the installation of a cable, comes within the proximity of the second part of the body of the pulling element.

According to the invention, a coupling between the first and the second part of the pulling element can be effected in a mechanical manner or by means of magnetic force.

The invention is based on the insight that for an optimum installation of cables in ducts with different inner diameters increasing in the installing direction, it is advantageous to build up the pulling element from two or more parts each optimally adapted to the inner diameter of the relevant duct, whereby the first part of the pulling element, after the installation of a cable in the duct or ducts with the first diameter, couples with the second part of the pulling element, which is ready at the beginning of the length of duct having the second, greater diameter. The second part of the pulling element can be placed at the beginning of the length of duct with the second diameter at the time when the installation of the cable is to take place, for instance by detaching at that point the coupling piece connecting the duct with the first diameter to the duct with the second diameter. Preferably, however, the second part of the pulling element is already fitted at the location of the coupling between a duct with a first diameter and a duct with a second diameter when the ducting system is being installed or completed, so that installation can subsequently take place without further digging work and the like.

It is noted that JP-A-5260622 discloses a pulling element for a cable, which consists of a body with a first part and a second part, which parts are permanently coupled to each other. The first and the second part are provided with flexible members which are expandable under fluid pressure, which members are in engagement with the inner wall of the duct in which the cable is installed. The first part of the body comprises a piston and the second part a hydraulic cylinder, so that the first part can be moved relative to the second part. By alternately expanding the flexible members and clamping them against the duct wall and extending or retracting the piston relative to the cylinder, the pulling element can be moved through the duct by small steps, which is particularly favourable when installing cables in a vertical duct. This publication, however does not mention a pulling element with two parts that are separate until the moment of coupling during operation, nor any successive ducts with different diameters.

According to a second aspect of the invention, a ducting system for cables, in particular telecommunication cables, is provided which comprises a first length of duct with a first diameter and a second length of duct with a second, greater diameter, there being provided a coupling piece for connecting the end of the first length of duct to the beginning of the second length of duct, characterized in that in the coupling piece or in the initial portion of the second length of duct a pulling element is arranged, comprising a body with a longitudinal opening, flexible members attached to the body, which are in engagement with the portion of the inner wall of the coupling piece that has substantially the same diameter as the second length of duct or with the inner wall of the second length of duct itself, and a coupling element arranged on the end of the body proximal to the first length of duct.

According to a third aspect of the invention, a coupling piece is provided for coupling a duct with a first diameter and a duct with a second, greater diameter, there being provided in the portion of the coupling piece intended for receiving the duct with the second diameter a pulling element comprising a body with a longitudinal opening, flexible members attached to the body, which are in engagement with the portion of the inner wall of the coupling piece that has substantially the same dimension as the inner diameter of the second duct, and a coupling element which is arranged on the end of the body proximal to the portion of the coupling piece intended for receiving the first duct.

BRIEF DESCRIPTION OF THE DRAWINGS

In the following, the invention will be further described on the basis of an exemplary embodiment, with reference to the drawing, wherein.

DETAILED DESCRIPTION

Figure 1:
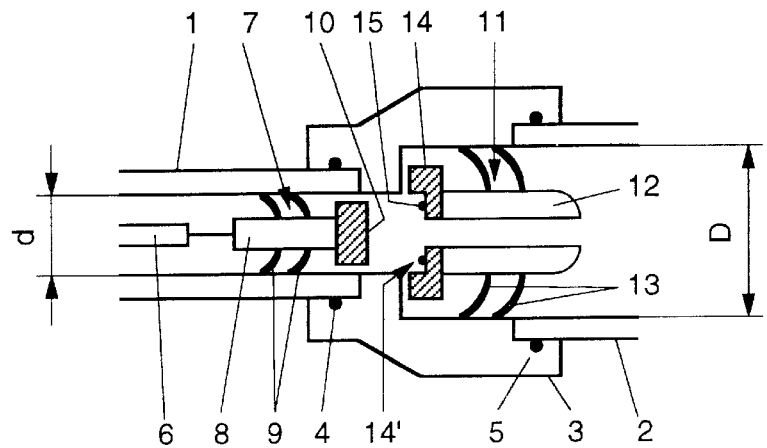
FIG. 1 is a cross section of a first embodiment of the pulling element according to the invention, placed in a coupling piece connecting two ducts of different diameters.
Figure 2:
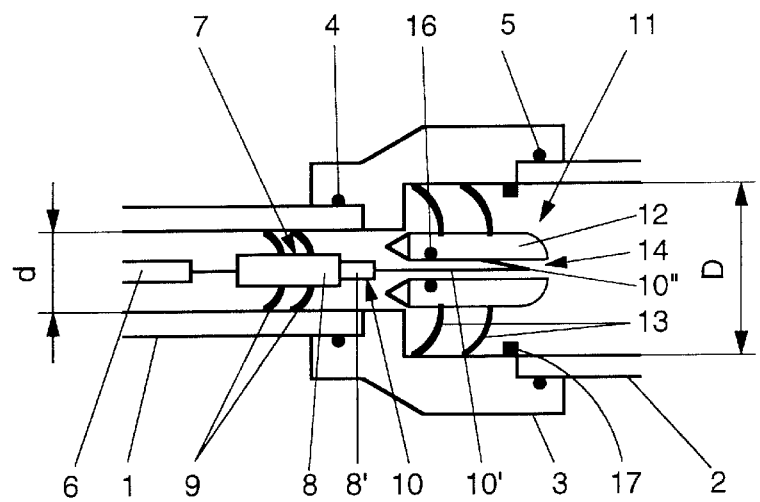
FIG. 2 is a similar cross section to FIG. 1, but now of a second embodiment of the pulling element.
Figure 3:
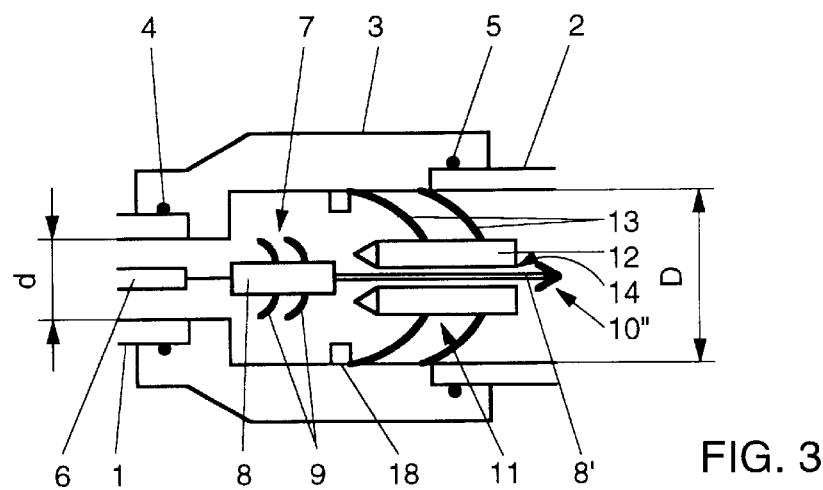
FIG. 3 is a similar cross section to FIG. 1, but now of a third embodiment of the pulling element.

In the figures, corresponding parts are denoted by the same reference numerals. FIGS. 1, 2 and 3 show an end portion of a first duct 1, which forms part of a first length of duct with a first inner diameter d, and an initial portion of a second duct 2, which forms part of a second length of duct with a second inner diameter D, with D>d. The end portion of duct 1 and the initial portion of duct 2 are coupled by means of a coupling piece 3, which at one end has an inner diameter substantially equal to the outer diameter d+2w of the duct 1, and at the other end has an inner diameter substantially equal to the outer diameter D+2W of the duct 2, where w is the wall thickness of the duct 1 and W is the wall thickness of the duct 2. For the purpose of a proper airtight and moisture-proof joint with the ducts 1 and 2, O-rings 4 and 5, respectively, are provided on the inside of the coupling piece 3.

Reference numeral 6 denotes an end of a cable, in particular a telecommunication cable, and more particularly a telecommunication cable with optical glass fibers, to be installed in a ducting system of which ducts 1 and 2 form a part. The end 6 is connected to the body 8 of a pulling element 7 so as to be resistant to tensile strain. The body 8, in a manner known per se, is provided with flexible members 9 in some form, which abut against the inner wall of the duct 1, so that if a source of fluid under pressure, for instance a source of compressed air, is connected to the other end, not shown, of duct 1, the pulling element 7 is propelled through the duct as a result of the pressure of the fluid.

Such a pulling element 7 is generally known from, for instance, EP-A-0,445,858 and can be completely closed in cross section but can also be provided with openings through which a part of the fluid can pass, as explained in the aforementioned European patent application.

According to the invention, the forward end—viewed in the direction of insertion of the cable end 6—of the body 8 of the pulling element 7 is provided with a coupling member 10. In the exemplary embodiment according to FIG. 1, the coupling member comprises a part of a magnetic coupling, and in the embodiment according to FIGS. 2 and 3 it comprises a part of a mechanical coupling. Further, according to the invention, in the portion of the coupling piece 3 connected to the initial portion of the duct 2, a second pulling element 11 is arranged, with a body 12 and flexible members 13, which abut against the inner wall of the duct 2 and fulfil the same function as the flexible members 9 of the pulling element 7 in the duct 1. The body 12 is provided with a coupling element 14 capable of cooperating with the coupling member 10 at the end of the pulling element 7.

In FIG. 1 the coupling member 10 comprises ferromagnetic material or a magnetic element and the coupling element 14 also comprises a magnetic element or a ferromagnetic material, at least one of the coupling member 10 and the coupling element 14 being a magnetic element. The coupling element 14 and the body 12 of the pulling element 11 have a central opening. For an airtight joint between the coupling member 10 and the coupling element 14, the coupling element 14 can be provided with a recess 14', into which coupling member 10 fits, and optionally with a rubber O-ring 15 to optimize the seal.

In FIG. 2 the coupling member 10 comprises an extension 8' of the body 8, which fits within the coupling element 14, which comprises central opening in the body 12 of the pulling element 11. To couple the two pulling elements 7 and 11 permanently, the end 8' is provided with a hook 10', of such length that the hook-shaped end 10" of the hook 10' projects beyond the forward end of the opening in the body 12 of the pulling element 11 when the body 8 of the pulling element 7 rests against the proximal end of the body 12 of the pulling element 11. For a good seal between the element 11 and the central opening, the latter can be provided with an O-ring 16.

In FIG. 3 the coupling member 10 comprises an extension of the body 8 of the pulling element 7, having at the end thereof a barb in the form of a flexible member 10''', for instance a rubber disc, which passes through the coupling element 14, which comprises the central opening so as to close off the central opening as the flexible member 10 passes therethrough and, after passing therethrough, forms a stop at the forward end of the body 12, which stop seals the central opening as soon as the compressed air pressure strikes the second pulling element.

When inserting a cable into a ducting system comprising (inter alia) the ducts 1 and 2, as described, for instance a source of compressed air is connected to the end of the duct 1 that is not shown, so that the pulling element 7, as a result of the compressed air pressure, is moved through the duct 1 and thus installs the cable end 6 and hence a cable in the duct. The air cushion that is built up in front of the pulling element 7 can escape via the central opening in the body 12 of the pulling element 11. When the pulling element 8 reaches the end of duct 1, the coupling member 10 engages the coupling element 14, whereby either a magnetic coupling or a mechanical coupling between the two pulling elements is produced, and the central opening in the body 12 is closed off, so that the pulling element 11 can take over the function of the pulling element 7 to guide the cable end 6 through the duct 2.

To avoid the pulling element 11 leaving its position prematurely, that is, before the coupling has been realized, it is possible to provide on the inside of the coupling piece 3 a cam-shaped ridge 17 which can only be passed by the flexible members 13 as a result of the air pressure built up after the coupling.

In the embodiment according to FIG. 3, to avoid the pulling element 11 being displaced too early as a result of the flexible member 10''' closing off the central opening of the body, that is, before the coupling has been effected, the coupling should be completed before the pulling element 7 leaves the duct 1 and the air pressure strikes the pulling element 11. To that end, the pulling element 11 can, for instance, be placed against a cam-shaped ridge 18 on the inside of the coupling piece.

Finally, it is noted that the body 12 of the second part of the pulling element can be provided with an air passage in such a manner that it is maintained also after the coupling with the first part, thereby to realize for the second portion of the length of duct a semi-open pulling element with the advantages described in EP-A-0,445,858.

As described, the pulling element according to the invention is particularly suitable for use in installing cables in ducting lines comprising ducts with more than one duct diameter, increasing in the installing direction. Such transitions from a first duct diameter to a second, greater duct diameter can, for instance, occur between two different sections of a telecommunications network, for instance because one section was laid at a later time than the other section. With the passage of time, often smaller duct diameters are installed because:

a need arises for a greater concentration of cores in the network to be installed;

the cable diameters become smaller, for instance due to the transition from copper cable to glass fiber cable; and/or improvements in the art enable an increasingly higher degree of miniaturization.

It will be clear to those skilled in the art that within the scope of the invention different variations of the pulling elements 7 and 11 which likewise embody the concept underlying the invention, are possible. In addition, it will be clear that the pulling element can consist of more than two parts, each having a cross section adapted to a specific duct diameter, thereby enabling a cable to be installed by means of air pressure in a ducting line comprising ducts having more than two different, successively greater duct diameters.

I claim:

1. A pulling device adapted to install a cable in each of a first duct having a first diameter and a second duct having a second diameter greater than the first diameter, said pulling device comprising:

an independently operable first pulling element comprising a first main body and first flexible members provided around the first main body for sealing engagement with an inner wall of the first duct, said first main body having a first end which is connectable to the cable and a second end which includes a coupling member; and a separate, unlinked second pulling element comprising a second main body and second flexible members provided around the second main body for sealing engagement with an inner wall of the second duct, said second main body having a central longitudinal opening and a coupling element for cooperating with the coupling member of the first pulling element so as to actively couple the first and second pulling elements when the first pulling element is proximal to the second pulling element such that the first and second pulling elements form a single unitary body.

2. The pulling device according to claim 1, wherein the coupling member of the first pulling element and the coupling element of the second pulling element form a magnetic coupling.

3. The pulling device according to claim 2, wherein a first one of the coupling member and the coupling element comprises a magnetic material, and a second one of the coupling member and the coupling element comprises one of a ferromagnetic and a magnetic material.

4. The pulling device according to claim 1, wherein the coupling member of the first pulling element and the coupling element of the second pulling element form a mechanical coupling.

5. The pulling device according to claim 4, wherein the coupling member comprises a hook-shaped extension of the body of the first pulling element, and the coupling element comprises a forward end portion of a side wall of the central longitudinal opening in the second pulling element, and wherein the hook-shaped extension of the body of the first pulling element engages the forward end portion of the side wall of the central longitudinal opening in the second pulling element when the first pulling element and the second pulling element are coupled together.

6. The pulling device according to claim 4, wherein the coupling member comprises an extension of the body of the first pulling element having at an end thereof a flexible disc-shaped member, and the coupling element comprises a front wall of the second pulling element, and wherein the flexible disc-shaped member of the extension of the body of the first pulling element passes through the central longitudinal opening in the second pulling element and engages the front wall of the second pulling element when the first pulling element and the second pulling element are coupled together.

7. The pulling device according to claim 1, further comprising a sealing element for airtightly sealing the coupling member of the first pulling element and the coupling element of the second pulling element when the first pulling element and the second pulling element are coupled together.

8. The pulling device according to claim 1, wherein the first pulling element includes a longitudinal opening.

9. The pulling device according to claim 1, further comprising an air passage which is maintained after the first pulling element and the second pulling element are coupled together.

10. A pulling device comprising:

an independently operable first pulling element comprising a first main body and first flexible members provided around the first main body, said first main body having a first end which is connectable to the cable and a second end which includes a coupling member; and a second pulling element comprising a second main body and second flexible members provided around the second main body, said second main body having a central longitudinal opening and a coupling element for cooperating with the coupling member of the first pulling element so as to actively couple the first and second pulling elements when the first pulling element is proximal to the second pulling element;

wherein said first flexible members are expandable to a first maximum diameter and said second flexible members are expandable to a second maximum diameter greater than the first maximum diameter.

11. The pulling device according to claim 10, wherein the coupling member of the first pulling element and the coupling element of the second pulling element form a magnetic coupling.

12. The pulling device according to claim 11, wherein a first one of the coupling member and the coupling element comprises a magnetic material, and a second one of the coupling member and the coupling element comprises one of a ferromagnetic and a magnetic material.

13. The pulling device according to claim 10, wherein the coupling member of the first pulling element and the coupling element of the second pulling element form a mechanical coupling.

14. The pulling device according to claim 13, wherein the coupling member comprises a hook-shaped extension of the body of the first pulling element, and the coupling element comprises a forward end portion of a side wall of the central longitudinal opening in the second pulling element, and wherein the hook-shaped extension of the body of the first pulling element engages the forward end portion of the side wall of the central longitudinal opening in the second pulling element when the first pulling element and the second pulling element are coupled together.

15. The pulling device according to claim 13, wherein the coupling member comprises an extension of the body of the first pulling element having at an end thereof a flexible disc-shaped member, and the coupling element comprises a front wall of the second pulling element, and wherein the flexible disc-shaped member of the extension of the body of the first pulling element passes through the central longitudinal opening in the second pulling element and engages the front wall of the second pulling element when the first pulling element and the second pulling element are coupled together.

16. The pulling device according to claim 10, further comprising a sealing element for airtightly sealing the coupling member of the first pulling element and the coupling element of the second pulling element when the first pulling element and the second pulling element are coupled together.

17. The pulling device according to claim 10, wherein the first pulling element includes a longitudinal opening.

18. The pulling device according to claim 10, further comprising an air passage which is maintained after the first pulling element and the second pulling element are coupled together.

* * * * *